United States Patent Office.

CHARLES COWAN, OF NEW YORK, N. Y.

Letters Patent No. 89,738, dated May 4, 1869.

IMPROVEMENT IN THE PREPARATION OF COPYING-PAPER.

The Schedule referred to in these Letters Patent and making part of the same.

*To all whom it may concern:*

Be it known that I, CHARLES COWAN, of the city, county, and State of New York, have invented a new and useful Improvement in the Preparation of Copying-Paper; and I do hereby declare the following to be a full, clear, and exact description thereof, which will enable those skilled in the art to make and use the same.

This invention relates to an improvement in the manufacture of copying-paper in oil-colors, either with or without the addition of such chemicals, which will render the marks produced by the copying-paper indelible.

In preparing my copying-paper I first prepare a mixture of the following ingredients: Boiled linseed-oil, two parts; spirits of turpentine, one part; copal varnish, one part.

With this compound I smear the paper thinly and evenly on one side, and allow it to soak and dry for about half an hour; then I apply the coloring-matter, which I prepare as follows: For black, I take, ivory-black, four parts; pure black lead, four parts; Prussian blue, one part.

This mixture I levigate very fine in raw linseed-oil, then I thin it to the consistency of strong mucilage, with the following mixture: Oil, (pure olive,) two parts; spirits of turpentine, two parts; adding a quarter of an ounce of beeswax to every quart of this mixture, the beeswax being incorporated with the liquids as follows: Heat the oil and turpentine in a water-bath to about 100° Fahrenheit, then take a small portion thereof and heat it in a water-bath to 200° Fahrenheit; then put in the wax, and after the wax has been quite dissolved, stir well and add it to the remainder of the quart of oil and turpentine; place all in a cool atmosphere or in cold water, and keep stirring round until quite cold.

From the coloring-matter thus prepared, I apply thin and even coats to the sheets of paper, which are then hung up on a line for about twenty-four hours, or until they are quite dry and ready for use.

If it is desired to enamel the paper thus prepared, I coat the sheets with a solution of gum-shellac in alcohol, made by dissolving a quarter of an ounce of gum-shellac in one quart of alcohol.

This solution is applied with a brush, then the paper is allowed to dry for half an hour, when it is ready for use.

For colors other than black, I reduce the quantity of spirits of turpentine in the levigating or thinning-mixture, taking only one part spirits of turpentine to two parts of oil.

For blue, I use, Prussian blue, seven parts; white lead, one part.

For crimson, I use, carmine, seven parts; white lead, one part.

For green, I use, chrome green, seven parts; white lead, one part.

For scarlet, I use, English vermilion, seven parts; white lead, one part.

For yellow, I use, orange chrome, seven parts; white lead, one part.

If it is desired to produce indelible marks from any of these papers, I prepare a solution of, nitrate of silver, four drachms; alcohol, one pint.

This solution I mix with the preparation for coating the paper.

My copying-paper is applicable to making copies of letters, designs, or characters of any desired description, and it can be used with particular advantage in making copies of letters while the same are being written.

What I claim as new, and desire to secure by Letters Patent, is—

The within-described compound for preparing copying-paper, made of the ingredients herein specified, mixed together substantially in the manner set forth.

Also, treating paper first with a compound of boiled linseed-oil, spirits of turpentine, and copal varnish, then with a coloring-compound levigated with a mixture of oil, turpentine, and beeswax, substantially as described.

This specification signed by me, this 12th day of April, 1869.

CHAS. COWAN.

Witnesses:
W. HAUFF,
J. F. ALEXANDER.